United States Patent [19]

Scott

[11] Patent Number: 4,554,490

[45] Date of Patent: Nov. 19, 1985

[54] VARIABLE-FREQUENCY DUAL-MOTION FEEDER CONTROL USING A SINGLE PHASE POWER SOURCE

[75] Inventor: Junius D. Scott, Homer City, Pa.

[73] Assignee: FMC Corporation, Chicago, Ill.

[21] Appl. No.: 540,592

[22] Filed: Oct. 11, 1983

[51] Int. Cl.[4] .............................................. H02K 33/00

[52] U.S. Cl. ...................................... 318/130; 318/132

[58] Field of Search ................................. 318/128–132

[56] References Cited

U.S. PATENT DOCUMENTS

| | | | |
|---|---|---|---|
| 3,372,793 | 3/1968 | Redford et al. . | |
| 3,400,316 | 9/1968 | Kuschel | 318/132 X |
| 3,649,893 | 3/1972 | Lajoie | 318/128 X |
| 3,904,900 | 9/1975 | Shichida et al. . | |
| 3,924,730 | 12/1975 | Brown . | |
| 4,215,297 | 7/1980 | Jacquemet | 318/130 |

*Primary Examiner*—Donovan F. Duggan
*Attorney, Agent, or Firm*—L. B. Guernsey; H. M. Stanley; R. B. Megley

[57] ABSTRACT

A variable-frequency feeder control using a single oscillator to develop signals for moving materials in either one of two directions. An output signal from the oscillator is applied to a first timing circuit which develops signal pulses for driving a horizontal electromagnetic drive coil. The first timing circuit controls the duration of the signal pulses which determine the amplitude of power to drive the horizontal coil. The output signal from the oscillator is applied to a second timing circuit which developes a phase shifted signal to control the phase between the power applied to the horizontal coil and the power applied to a vertical drive coil. A third timing circuit uses the phase shifted signal to develop signal pulses for driving the vertical coil and controls the duration of the drive pulses.

12 Claims, 3 Drawing Figures

VARIABLE-FREQUENCY DUAL-MOTION FEEDER CONTROL USING A SINGLE PHASE POWER SOURCE

BACKGROUND OF THE INVENTION

The present invention pertains to a feeder control for vibratory material handling equipment, and more particularly, to a variable-frequency dual-motion control using a single phase AC power source.

Certain types of vibratory material handling equipment, such as part feeders, utilize electromagnets as the exciting force with an electromagnet coil energized during a portion of the feed time. A variety of stroke lengths and a variety of drive frequencies are used to provide optimum material feed rates, depending upon the material being fed by the equipment. Low drive frequencies may reduce strain on the mechanical portion of the equipment, reduce noise levels and improve efficiency of feeding of many materials. Other materials may require higher drive frequencies.

A variable-frequency, dual-motion type of bowl feeder consists of one drive to provide a vertical motion and another drive to provide a horizontal motion. A spring system allows the bowl feeder to move independently in both the vertical mode and in the horizontal mode. By exciting the vertical drive system and the horizontal drive system in one particular phase relationship material will be conveyed in one direction, and by reversing this phase relationship material may be conveyed in the opposite direction. Thus, any feed angle desired may be obtained by varying the phase relationship between the drive to the vertical and horizontal coils.

SUMMARY OF THE INVENTION

The present invention provides the feeder control having means for varying the frequency of operation and for varying the direction of drive of materials using a single phase AC power source to provide power. A stable variable frequency oscillator provides signals for driving a horizontal electromagnetic drive coil with the amount of drive current controlled by a first drive circuit connected between the horizontal drive coil and the oscillator. A phase shift circuit changes the phase of the oscillator signal to provide timing signals for a vertical electromagnetic drive coil. A second drive circuit controls the amount of drive current to the vertical coil. The phase shifting circuit and the drive circuits control the speed and direction of movement of materials moved by the feeder drive coils by controlling the phase and amount of drive current to the two coils.

DESCRIPTION OF THE PREFERRED EMBODIMENT

Figure 1:
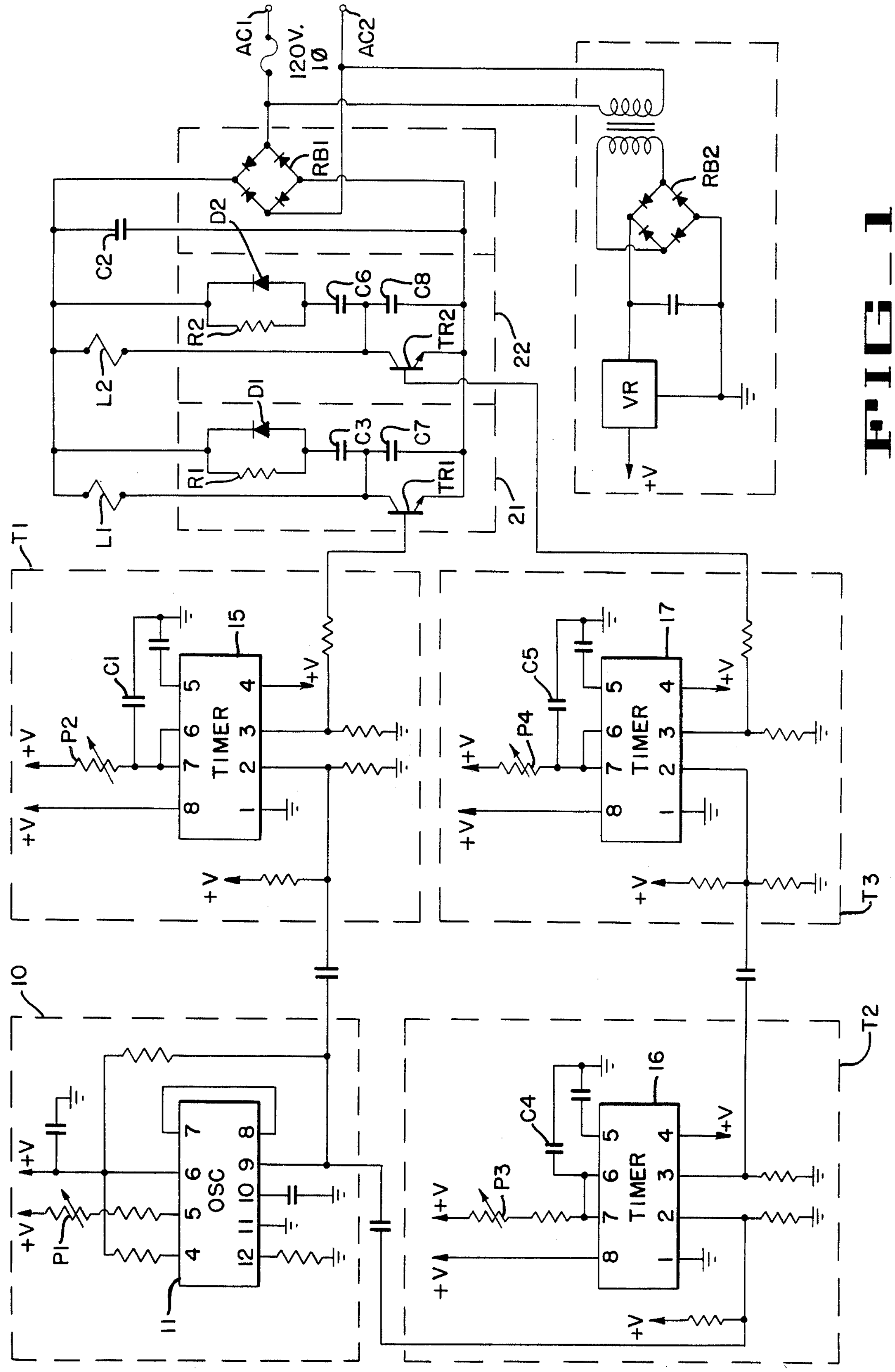
FIG. 1 is a schematic diagram of a variable-frequency dual-motion controller according to the present invention.

Referring to FIG. 1, a stable variable-frequency oscillator 10 provides square wave timing signals (FIG. 2) to a pair of timing circuits T1, T2. The frequency of the signals from the oscillator 10 is determined by the setting of a variable resistor P1 and can be varied over a wide frequency range. One integrated circuit 11 which can be used for the oscillator is the 8038 manufactured by the Intersil Corporation, Cupertino, Calif. This oscillator can be operated at a low frequency of considerably less than one cycle per second and up to a high frequency of several thousand cycles per second.

The timing signals from oscillator 10 trigger the timing circuit T1 which produces a series of square wave pulses (FIG. 2) each having a time duration determined by the setting of a variable resistor P2. The timer T1 is triggered on the negative edge of the output signal from the oscillator 10 and the width of the drive pulses at the output of the timer T1 is determined by the values of resistor P2 and a capacitor C1. These drive pulses each render a transistor TR1 conductive and provide driving power to a horizontal electromagnetic drive coil L1. The width of the pulses A–H (FIG. 2) determines the amount of time that power is applied to the coil L1 and determines the amplitude of vibration of a feeder (not shown) attached to the coil L1. The drive pulses A, B (FIG. 2) provide a relatively low power drive to the coil L1, while the longer duration pulses C, D provide larger amounts of drive power to coil L1.

Figure 3:
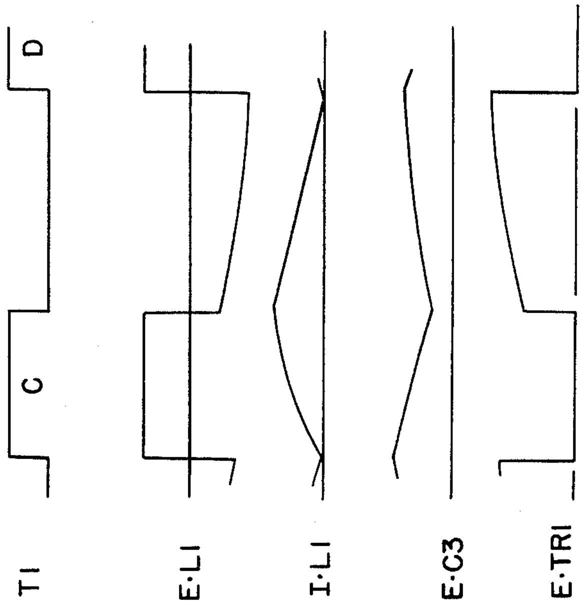

A DC voltage to operate the drive coils L1, L2 is provided by a rectifier bridge RB1 connected to a single phase AC line, and the DC voltage is filtered by a capacitor C2. A horizontal drive circuit 21 selectively applies the DC voltage to the drive coil L1 and provides protection against excessive voltage across the drive coil as drive current in the coil decreases. When a positive pulse (FIG. 3) is applied to the base of transistor TR1 the transistor is rendered conductive so the voltage on C2 is developed across coil L1, causing a current to flow from the upper plate of capacitor C2, through horizontal drive coil L1 and transistor TR1 to the lower plate of capacitor C2. The current through coil L1 builds up as shown in the IL1 waveform of FIG. 3, and this current decays when the transistor TR1 is rendered nonconductive. A capacitor C3, a resistor R1 and a diode D1 prevent a collapsing magnetic field about the coil from developing excessive voltage across coil L1 when the transistor TR1 is rendered nonconductive. When transistor TR1 is rendered nonconductive, the inductance of coil L1 causes current to continue to flow downward through coil L1, to the lower plate of capacitor C3, and from the upper plate of capacitor C3 upward through diode D1. The resistor R1 provides a controlled discharge path for capacitor C3 when transistor TR1 is again rendered conductive.

Figure 2:
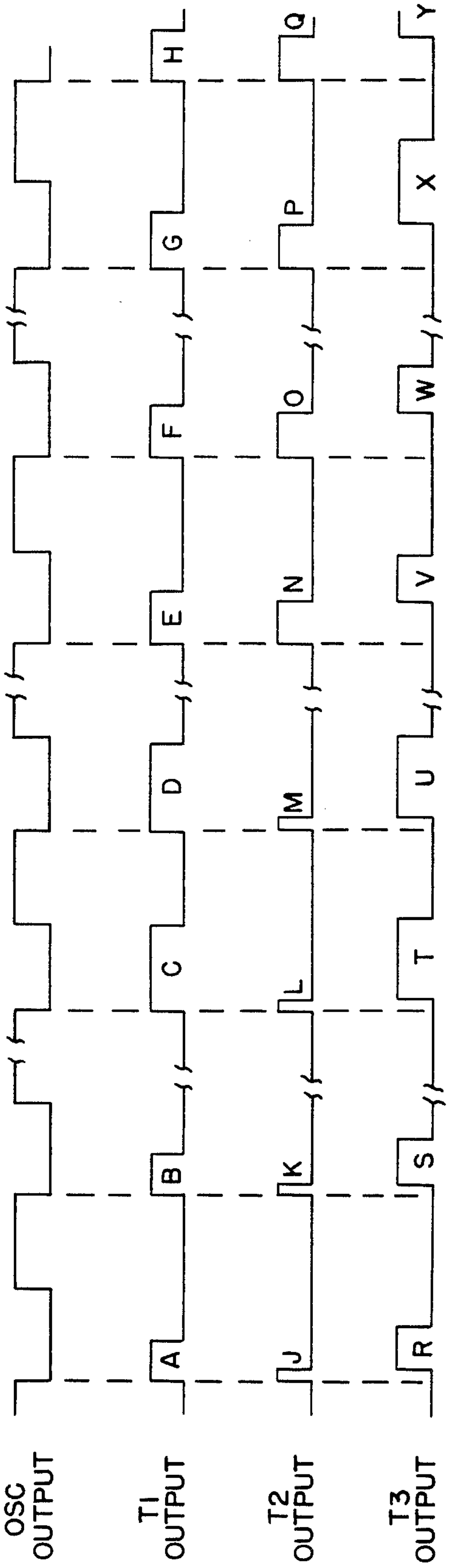
FIGS. 2 and 3 are voltage and current waveforms useful in explaining the operation of the controller circuit of FIG. 1.

The phase relationship between the horizontal drive current and the vertical drive current is selected by a timing circuit T2. The timing circuit T2 (FIG. 2) is triggered on the negative edge of the output signal from the oscillator 10 and the width of the phase-shifted pulse at the output of the timing circuit T2 is determined by the values of a variable resistor P3 and a capacitor C4. The phase-shifted pulses from the timing circuit T2 are applied to the input of a timing circuit T3 which is triggered on the negative edge of the pulses from the timing curcuit T2. The timing circuit T3 produces a series of square drive pulses (FIG. 2) each having a time duration determined by the value of a variable resistor P4 and a capacitor C5. The drive pulses each render a transistor TR2 conductive and cause a vertical drive circuit 22 to provide driving power to a vertical electromagnetic drive coil L2. The width of the drive pulses R–X determine the amount of time that power is applied to the vertical coil L2 and determine the amplitude of vibration of the feeder (not shown) attached to coil L2. The width of the pulses from the phase shift timing circuit T2 determine a phase relationship between the drive pulses from the timing circuit T1 and the drive pulses from the timing circuit T3 as seen in FIG. 2. One integrated circuit which can be used for the timers 15–17 is the 555 made by Motorola, Inc., Phoenix, Ariz.

Power to operate the oscillator 10 and the timers T1, T2, T3 is supplied by a rectifier bridge RB2 and a voltage regulator VR which are coupled to the same single phase AC supply that provided power for operating the electromagnetic coils L1, L2. One voltage regulator which can be used in the present invention is the 7812 made by Motorola, Inc.

The vertical drive circuit 22 includes a capacitor C6, a resistor R2 and a diode D2 which limit the value of voltage across coil L2 when the transistor TR2 is rendered nonconductive. When transistor TR2 is rendered nonconductive a collapsing magnetic field about coil L2 causes current to continue to flow downward and to charge capacitor C6 through the diode D2. The resistor R2 provides a controlled discharge path for capacitor C6 when transistor TR2 is again rendered conductive. A pair of capacitors C7, C8 limit the amount of voltage developed across the transistors TR1, TR2.

Although the best mode contemplated for carrying out the present invention has been herein shown and described, it will be apparent that modification and variation may be made without departing from what is regarded to be the subject matter of the invention.

What is claimed is:

1. A variable-frequency dual-motion feeder control for use with a single phase power source and a pair of drive coils, said control being adapted to move a variety of materials in either one of two directions, said control comprising:

- a variable-frequency oscillator for providing a timing signal having a continuously variable range of frequencies for operating said drive coils at a frequency best adapted to move a given material;
- first and second coil drive circuits;
- a power supply for connection to said power source for developing power for driving said pair of coils;
- means for connecting said first drive circuit between said power supply and a first of said coils to provide drive pulses to said first coil;
- means for connecting said second drive circuit between said power supply and a second of said coils to provide drive pulses to said second coil;
- means for connecting said oscillator to said first drive circuit for using said timing signals to control the duration of each of a plurality of drive pulses coupled to said first coil and thereby control the amount of power to said first coil;
- phase shifting means connected between said oscillator and said second drive circuit for developing phase-shifted timing signals to control the phase of drive pulses to said second coil relative to drive pulses to said first coil; and
- means for controlling the duration of each of a plurality of drive pulses coupled to said second coil and thereby control the amount of power to said second coil.

2. A feeder control as defined in claim 1 wherein said means for controlling the amount of power to said first and said second drive coils controls the amount of vibration of a feeder adjacent said coils.

3. A feeder control as defined in claim 1 including means for controlling the relative phase of power applied to said first and said second drive coils to control the phase of vibration of a feeder adjacent said coils.

4. A feeder control as defined in claim 1 including a first timing means for controlling the amount of driving power to said first coil, a second timing means for controlling the amount of driving power to said second coil, and a third timing means for controlling the phase of driving power to said second coil relative to the phase of driving power to said first coil.

5. A variable-frequency dual-motion feeder control for use with a single phase power source, said control being adapted to move a variety of materials in either one of two directions, said control comprising:

- first and second drive coils;
- a variable-frequency oscillator for providing a timing signal having a continuously variable range of frequencies for operating said first and said second coils at a frequency best adapted to move a given material;
- a DC power supply for connection to said power source for developing power for driving said first and said second coils;
- first and second switching means, said first switching means being connected between said power supply and said first coil to supply drive pulses to said first coil in response to said oscillator timing signal, said second switching means being connected between said power supply and said second coil to supply drive pulses to said second coil in response to said oscillator timing signal;
- a first timing circuit connected between said oscillator and said first switching means to selectively render said first switching means conductive to control the duration of each of said drive pulses which energize said first coil; and
- a second timing circuit connected between said oscillator and said second switching means to selectively render said second switching means conductive to control the duration of each of said drive pulses which energize said second coil.

6. A feeder control as defined in claim 5 wherein said second timing circuit includes means for varying the conductive time of said second switching means relative to the conductive time of said first switching means to vary the phase of drive of said second coil relative to the phase of drive of said first coil.

7. A feeder control as defined in claim 5 including power means for providing an operating voltage for said oscillator and for said first and said second timing circuits, said power means being connected to said single phase power source.

8. A feeder control as defined in claim 5 including means for controlling the duration of time said first and said second switching means are conductive to control the amount of driving power to said first and said second coils.

9. A feeder control as defined in claim 5 wherein said first timing circuit controls the amount of driving power to said first coil, and said second timing circuit controls the amount of driving power to said second coil.

10. A feeder control as defined in claim 5 including a capacitor and a unidirectional conducting device connected as a series circuit, said series circuit being connected in parallel with said first coil to protect said first coil from developing large voltages when said first switching means is rendered nonconductive, and a resistor connected in parallel with said unidirectional device to provide a discharge of said capacitor when said first switching means is rendered conductive.

11. A feeder control as defined in claim 1 wherein said phase shifting means includes means for providing a continuously variable range in differences between the phase of pulses to said first coil and the phase of pulses to said second coil.

12. A feeder control as defined in claim 5 including a third timing circuit connected between said oscillator and said second timing circuit to provide a continuously variable range in differences between the phase of drive pulses to said first coil and the phase of drive pulses to said second coil.

* * * * *